US008374883B2

(12) United States Patent
Zhong et al.

(10) Patent No.: US 8,374,883 B2
(45) Date of Patent: Feb. 12, 2013

(54) ENCODER AND DECODER USING INTER CHANNEL PREDICTION BASED ON OPTIMALLY DETERMINED SIGNALS

(75) Inventors: Haishan Zhong, Singapore (SG); Zongxian Liu, Singapore (SG); Kok Seng Chong, Singapore (SG); Koji Yoshida, Kanagawa (JP)

(73) Assignee: Panasonic Corporation, Osaka (JP)

( * ) Notice: Subject to any disclaimer, the term of this patent is extended or adjusted under 35 U.S.C. 154(b) by 402 days.

(21) Appl. No.: 12/740,020

(22) PCT Filed: Oct. 31, 2008

(86) PCT No.: PCT/JP2008/003151

§ 371 (c)(1), (2), (4) Date: Apr. 27, 2010

(87) PCT Pub. No.: WO2009/057327

PCT Pub. Date: May 7, 2009

(65) Prior Publication Data

US 2010/0250244 A1 Sep. 30, 2010

(30) Foreign Application Priority Data

Oct. 31, 2007 (JP) ................................ 2007-284622

(51) Int. Cl.

| | |
|---|---|
| ***G06F 15/00*** | (2006.01) |
| ***G10L 19/14*** | (2006.01) |
| ***G10L 19/00*** | (2006.01) |
| ***G10L 21/04*** | (2006.01) |

(52) U.S. Cl. ........ 704/500; 704/200; 704/205; 704/219; 704/220; 704/218; 704/501; 704/502; 704/503; 704/504

(58) Field of Classification Search .................. 704/200, 704/205, 219, 220, 500–504

See application file for complete search history.

(56) References Cited

U.S. PATENT DOCUMENTS 5,434,948 A 7/1995 Holt et al.
5,684,923 A * 11/1997 Suzuki et al. ................. 704/229

(Continued)

FOREIGN PATENT DOCUMENTS

CN 1629937 6/2005
JP 07-023009 1/1995

(Continued)

OTHER PUBLICATIONS

Makinen, J.; Bessette, B.; Bruhn, S.; Ojala, P.; Salami, R.; Taleb, A.; , "AMR-WB+: a new audio coding standard for 3rd generation mobile audio services," Acoustics, Speech, and Signal Processing, 2005. Proceedings. (ICASSP '05). IEEE International Conference on , vol. 2, No., pp. ii/1109-ii/1112 vol. 2, Mar. 18-23, 2005.*

(Continued)

*Primary Examiner* — Paras D Shah

(74) *Attorney, Agent, or Firm* — Greenblum & Bernstein, P.L.C.

(57) ABSTRACT

An encoder improves inter-channel prediction (ICP) performance in scalable stereo sound encoding using an ICP. In the encoder, ICP analysis units use, as reference signal candidates, a frequency coefficient in the low-band portion of a side residual signal, a frequency coefficient in each sub-band portion of a monaural residual signal, and a frequency coefficient in the low-band portion of the monaural residual signal, respectively, and perform an ICP analysis between the these respective candidates and a frequency coefficient in each sub-band portion of the side residual signal to generate first, second, and third ICP coefficients. A selection unit selects an optimum reference signal from among the reference signal candidates by checking the relationship between the respective reference signal candidates and the frequency coefficient in each sub-band portion of the side residual signal and outputs, to an ICP parameter quantization unit, a reference signal ID indicating the selected reference signal and an ICP coefficient corresponding to the reference signal.

10 Claims, 11 Drawing Sheets

U.S. PATENT DOCUMENTS

| | | | | |
|---|---|---|---|---|
| 5,812,971 | A * | 9/1998 | Herre | 704/230 |
| 6,393,392 | B1 * | 5/2002 | Minde | 704/220 |
| 6,680,972 | B1 | 1/2004 | Liljeryd et al. | |
| 7,627,480 | B2 * | 12/2009 | Ojanpera | 704/500 |
| 7,630,396 | B2 * | 12/2009 | Goto et al. | 370/464 |
| 7,668,722 | B2 * | 2/2010 | Villemoes et al. | 704/500 |
| 7,903,824 | B2 * | 3/2011 | Faller et al. | 381/23 |
| 7,917,369 | B2 * | 3/2011 | Chen et al. | 704/500 |
| 2002/0091514 | A1 | 7/2002 | Fuchigami | |
| 2004/0064311 | A1 | 4/2004 | Sinha et al. | |
| 2005/0267763 | A1 | 12/2005 | Ojanpera | |
| 2008/0052066 | A1 | 2/2008 | Oshikiri et al. | |
| 2008/0136686 | A1 * | 6/2008 | Feiten | 341/60 |

FOREIGN PATENT DOCUMENTS

| | | |
|---|---|---|
| JP | 10-051313 | 2/1998 |
| JP | 11-509388 | 8/1999 |
| JP | 2004-151433 | 5/2004 |
| JP | 2006-350361 | 12/2006 |
| JP | 2007-17982 | 1/2007 |
| JP | 2007-279385 | 10/2007 |
| WO | 97/04621 | 2/1997 |
| WO | 2006/000842 | 1/2006 |
| WO | 2006/091139 | 8/2006 |

OTHER PUBLICATIONS

Salami, R.; Lefebvre, R.; Lakaniemi, A.; Kontola, K.; Bruhn, S.; Taleb, A.; , "Extended AMR-WB for high-quality audio on mobile devices," Communications Magazine, IEEE , vol. 44, No. 5, pp. 90-97, May 2006.*

3GPP TS 26.290 VO.5.6, Technical specification Group Service and System Aspects; Audio codec processing functions; Extended AMR Wideband codec; Transcoding functions (Release 6), 2004.

Fuchs H, "Improving joint stereo audio coding by adaptive inter-channel prediction", Applications of Signal Processing to Audio and Acoustics, 1993. Final Program and Paper Summaries., 1993 IEEE Workshop on New Paltz, NY, USA Oct. 17-20, 1993, New York, NY, USA, IEEE, XP010130083, Oct. 17, 1993.

3GPP TS 26.290 VO.5.6, Technical specification Group Service and System Aspects; Audio codec processing functions; Extended AMR Wideband codec; Transcoding functions (Release 6).

Search report from E.P.O., mail date is Aug. 26, 2011.

China Office action, mail date is Aug. 23, 2011.

U.S. Appl. No. 12/819,690 to Masahiro Oshikiri et al., which was filed on Jun. 21, 2010.

Extended AMR Wideband Speech Codec (AMR-WB+): Transcoding functions, 3GPP TS 26.290. V6.3.0, 2005.

S. Minami and O. Okada, "Stereophonic ADPCM Voice Coding Method," Proc. ICASSP'90, Apr. 1990.

Ye Wang and Miikka Vilermo, "The Modified Discrete Cosine Transform: Its Implications for Audio Coding and Error Concealment," AES 22$^{nd}$ International Conference on Virtual, Synthetic and Entertainment, 2002.

Sean A. Ramprashad, "The Multimode Transform Predictive Coding Paradigm," IEEE Tran. Speech and Audio Processing, vol. 11, pp. 117-129, Mar. 2003.

Wai C. Chu, "Speech Coding Algorithms: Foundation and Evolution of Standardized Coders", ISBN 0-471-37312-5, 2003.

* cited by examiner

ENCODER AND DECODER USING INTER CHANNEL PREDICTION BASED ON OPTIMALLY DETERMINED SIGNALS

TECHNICAL FIELD

The present invention relates to a coding apparatus and a decoding apparatus that realize scalable stereo speech coding using inter-channel prediction (ICP).

BACKGROUND ART

Conventionally, speech coding (speech codec) is used for communication applications using telephony narrowband speech (200 Hz to 3.4 kHz). Monophonic narrowband speech codec is widely used in communication applications including voice communication using mobile phones, teleconferencing equipment and packet networks (e.g. Internet).

One of steps towards more realistic speech communication system is the move from monophonic speech representation to stereophonic speech representation. Wideband stereophonic communications provide a more natural sounding environment. Scalable stereo speech coding is a core technology for realizing voice communications with superior quality and usability.

One of popular methods of encoding a stereo speech signal is attributed to employing a signal prediction scheme based on a monaural speech. That is, a reference channel signal is transmitted using known monaural speech codec, and the left or right channel is predicted from this reference channel signal using additional information and parameters. In many applications, a monaural signal in which a left channel signal and right channel signal are mixed is selected as the reference channel signal.

As stereo signal coding methods including intensity stereo coding (ISC), binaural cue coding (BCC) and inter-channel prediction (ICP) are known. These parametric stereo coding methods all have different strengths and weaknesses and are suitable for encoding different source materials.

Non-Patent Document 1 discloses a technique of predicting stereo signals based on monaural signals using these coding methods. Specifically, a monaural signal is acquired by synthesizing channel signals forming stereo signals (e.g. a left channel signal and a right channel signal), the acquired monaural signal is encoded/decoded using known speech codec, and, furthermore, from the monaural signal, a difference signal between the left channel and the right channel (i.e. a side signal) is predicted using prediction parameters. With this coding method, the coding side models the relationships between a monaural signal and a side signal using time-dependent adaptive filters and transmits filter coefficients calculated per frame to the decoding side. By filtering a high-quality monaural signal transmitted by monaural codec, the decoding side regenerates the difference signal and calculates the left channel signal and right channel signal from the regenerated difference signal and the monaural signal.

Further, Non-Patent Document 2 discloses a coding method referred to as "cross-channel correlation canceller" whereby, by applying a technique of cross-channel correlation canceller to the ICP scheme coding method, it is possible to predict one channel from the other channel.

Further, in recent years, an audio compression technique is rapidly developed, a modified discrete cosine transform (MDCT) scheme has been becoming a major technique of high-quality audio coding (see Non-Patent Documents 3 and 4).

MDCT has been applied to audio compression without major auditory problems if a proper window such as a sine window is employed. Recently, MDCT plays an important role in multimode transform predictive coding paradigms.

The multimode transform predictive coding refers to combining speech and audio coding principles in a single coding structure (see Non-Patent Document 4). It should be noted that the MDCT-based coding structure and application in Non-Patent Document 4 are designed for encoding signals in only one channel, and quantize MDCT coefficients in different frequency regions using different quantization schemes.

Non-Patent Document 1: Extended AMR Wideband Speech Codec (AMR-WB+): Transcoding functions, 3GPP TS 26.290.

Non-Patent Document 2: S. Minami and O. Okada, "Stereophonic ADPCM voice coding method," in Proc. ICASSP'90, April 1990.

Non-Patent Document 3: Ye Wang and Miikka Vilermo, "The modified discrete cosine transform: its implications for audio coding and error concealment," in AES 22nd International Conference on Virtual, Synthetic and Entertainment, 2002.

Non-Patent Document 4: Sean A. Ramprashad, "The multimode transform predictive coding paradigm," IEEE Tran. Speech and Audio Processing, vol. 11, pp. 117-129, March 2003.

Non-Patent Document 5: Wai C. Chu, "Speech coding algorithms: foundation and evolution of standardized coders", ISBN 0-471-37312-5, 2003

DISCLOSURE OF INVENTION

Problems to be Solved by the Invention

In a case where the coding scheme in Non-Patent Document 2 is employed, when the correlation between the two channels is high, the performance of ICP is sufficient. However, when the correlation is low, higher order adaptive filter coefficients are needed, and, in some cases, it costs too much to improve the predicted gain. Unless the filter order is increased, the energy level of an prediction error may be the same as the energy level of a reference signal, and ICP is not useful in such a situation.

The low frequency part of a frequency band is essentially important to speech signal quality. Small errors in the low frequency part of the decoded speech damage the whole speech quality severely. Due to the limitations of prediction performance of ICP in speech coding, it is difficult to achieve satisfied performance for low frequency part when the correlation between the two channels is not high, and it is desirable to employ other coding schemes.

With Non-Patent Document 1, ICP is applied only to signals of high frequency band part in the time domain. This is one solution to the above problem. However, an input monaural signal is used for ICP at the encoder with Non-Patent Document 1. Preferably, a decoded monaural signal should be used. This is because on the decoder side, regenerated stereo signals are acquired by an ICP synthesis filter that uses monaural signals decoded by the monaural decoder. However, if the monaural encoder is a type of a transform coder which is widely used especially for wideband audio coding (7 kHz or above) such as MDCT transform coding, to acquire time-domain decoded monaural signals on the encoder side, some additional algorithmic delay is produced.

It is therefore an object of the present invention to provide a coding apparatus and a decoding apparatus that realize scalable stereo speech coding using inter-channel prediction (ICP) and improve ICP prediction performance in stereo speech coding.

Means for Solving the Problem

The coding apparatus of the present invention adopts the configuration including: a monaural signal generation section that synthesizes a first channel signal and a second channel signal in a stereo signal, to generate a monaural signal, and generates a side signal, the side signal being a difference between the first channel signal and the second channel signal; a side residual signal acquiring section that acquires a side residual signal, the side residual signal being a linear prediction residual signal for the side signal; a monaural residual signal acquiring section that acquires a monaural residual signal, the monaural residual signal being a linear prediction residual signal for the monaural signal; a first spectrum division section that divides the side residual signal into a low band part being a lower band than a predetermined frequency and a middle band part being a higher band than the predetermined frequency; a second spectrum division section that divides the monaural residual signal into a low band part being a lower band than a predetermined frequency and a middle band part being a higher band than the predetermined frequency; a selection section that selects an optimal signal as a reference signal from reference signal candidates by checking relationships between each reference signal candidate and a target signal, the reference signal candidates being frequency coefficients for the low band part of the side residual signal, frequency coefficients for the middle band part of the monaural residual signal, and frequency coefficients for the low band part of the monaural residual signal, and the target signal being frequency coefficients for the middle band part of the side residual signal; and an inter channel prediction analysis section that performs an inter-channel prediction analysis between the reference signal and the target signal, to acquire inter-channel prediction coefficients.

The decoding apparatus of the present invention adopts the configuration including: an inter-channel prediction synthesis section that selects a reference signal from: frequency coefficients for a low band part being a lower band than a predetermined frequency of a side residual signal, the side residual signal being a linear prediction residual signal for a side signal being a difference between a first channel signal and a second channel signal in a stereo signal; frequency coefficients for a middle band part being a higher band than a predetermined frequency of a monaural residual signal, the monaural residual signal being the linear prediction residual signal for a monaural signal generated by synthesizing the first channel signal and the second channel signal; and frequency coefficients for the low band part lower band than a predetermined frequency of the monaural residual signal, and that calculates the frequency coefficients for the middle band part of the side residual signal by filtering the reference signal using inter-channel prediction coefficients as filter coefficients acquired by performing an inter-channel prediction analysis between the reference signal and the frequency coefficients for the middle band part being a higher band than the predetermined frequency of the side residual signal; an addition section that adds the frequency coefficients for the low band part of the side residual signal and the frequency coefficients for the middle band part of the side residual signal, to acquire frequency coefficients for an entire band of the side residual signal; a linear prediction synthesis section that performs linear prediction synthesis filtering for the side residual signal, to acquire the side signal; and a stereo signal calculation section that acquires the first channel signal and the second channel signal using the monaural signal and the side signal.

The coding method of the present invention includes the steps of: a monaural signal generation step of synthesizing a first channel signal and a second channel signal in a stereo signal, to generate a monaural signal, and generating a side signal, the side signal being a difference between the first channel signal and the second channel signal; a side residual signal acquiring step of acquiring a side residual signal, the side residual signal being a linear prediction residual signal for the side signal; a monaural residual signal acquiring step of acquiring a monaural residual signal, the monaural residual signal being a linear prediction residual signal for the monaural signal; a first spectrum division step of dividing the side residual signal into a low band part being a lower band than a predetermined frequency and a middle band part being a higher band than the predetermined frequency; a second spectrum division step of dividing the monaural residual signal into a low band part being a lower band than a predetermined frequency and a middle band part being a higher band than the predetermined frequency; a selection step of selecting an optimal signal as a reference signal from reference signal candidates by checking relationships between each reference signal candidate and a target signal, the reference signal candidates being frequency coefficients for the low band part of the side residual signal, frequency coefficients for the middle band part of the monaural residual signal, and frequency coefficients for the low band part of the monaural residual signal, and the target signal being frequency coefficients for the middle band part of the side residual signal; and an inter channel prediction analysis step of performing an inter-channel prediction analysis between the reference signal and the target signal, to acquire inter-channel prediction coefficients.

The decoding method of the present invention includes the steps of: an inter-channel prediction synthesis step of selecting a reference signal from: frequency coefficients for a low band part being a lower band than a predetermined frequency of a side residual signal, the side residual signal being a linear prediction residual signal for a side signal being a difference between a first channel signal and a second channel signal in a stereo signal; frequency coefficients for a middle band part being a higher band than a predetermined frequency of a monaural residual signal, the monaural residual signal being the linear prediction residual signal for a monaural signal generated by synthesizing the first channel signal and the second channel signal; and frequency coefficients for the low band part lower band than a predetermined frequency of the monaural residual signal, and that calculates the frequency coefficients for the middle band part of the side residual signal by filtering the reference signal using inter-channel prediction coefficients as filter coefficients acquired by performing an inter-channel prediction analysis between the reference signal and the frequency coefficients for the middle band part being a higher band than the predetermined frequency of the side residual signal; an addition step of adding the frequency coefficients for the low band part of the side residual signal and the frequency coefficients for the middle band part of the side residual signal, to acquire frequency coefficients for an entire band of the side residual signal; a linear prediction synthesis step of performing linear prediction synthesis filtering for the side residual signal, to acquire the side signal; and a stereo signal calculation step of acquiring the first channel signal and the second channel signal using the monaural signal and the side signal.

Advantageous Effects of Invention

According to the present invention, by selecting a signal providing the optimum prediction result as a reference signal among a plurality of signals and by predicting a residual signal of a side signal using the reference signal, it is possible to improve ICP prediction performance in stereo speech coding.

BEST MODE FOR CARRYING OUT THE INVENTION

Embodiment 1

Now, embodiments of the present invention will be described in detail with reference to the accompanying drawings. In the following explanation, a left channel signal, a right channel signal, a monaural signal and a side signal are represented as "L," "R," "M," and "S," respectively, and their regenerated signals are represented as "L'," "R'," "M'," and "S'," respectively. Further, with the following explanation, the length of each frame is represented as "N," and MDCT domain signals (referred to as "frequency coefficients" or "MDCT coefficients") for a monaural signal and a side signal are represented as m(f) and s(f), respectively.

Figure 1:
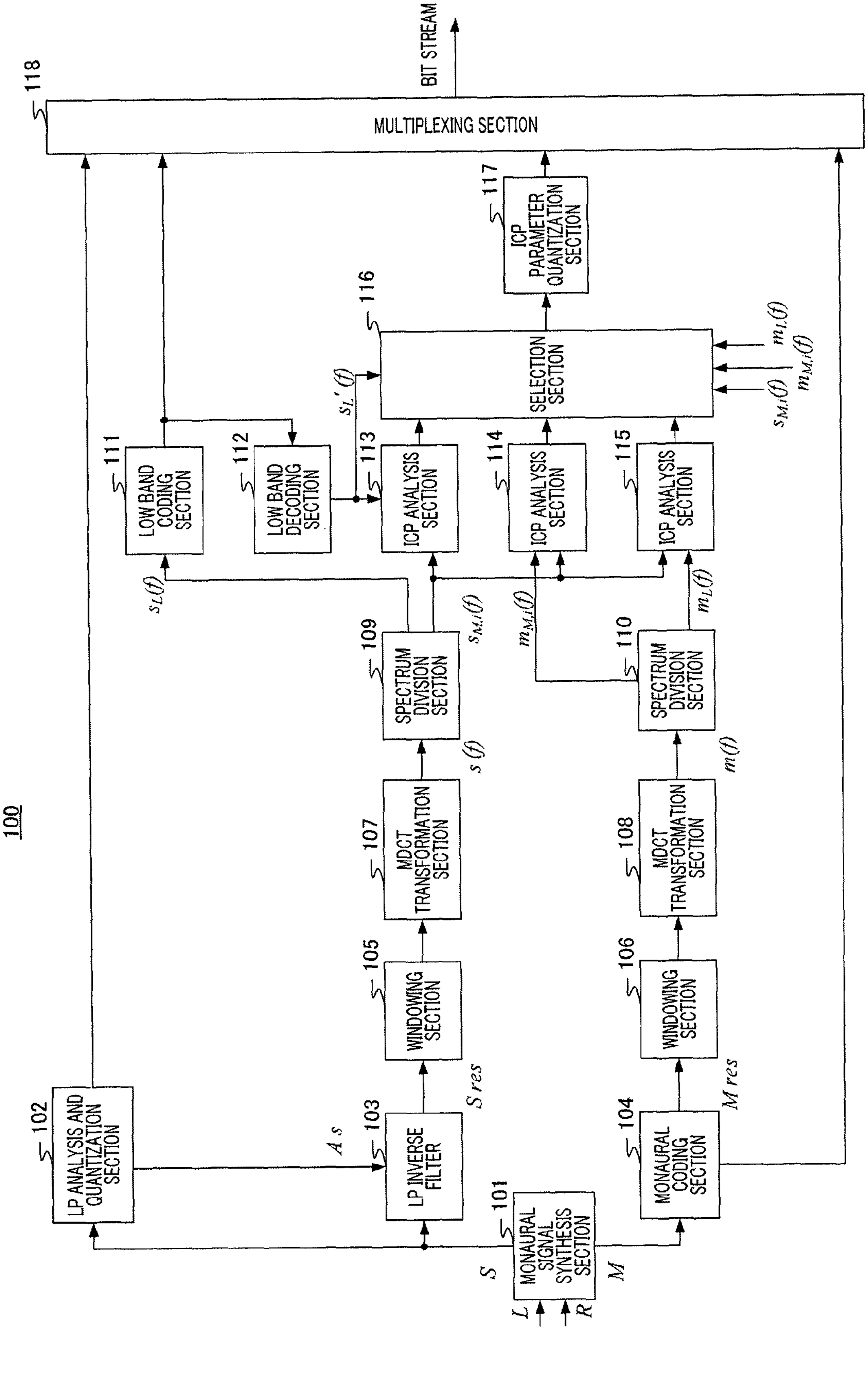
FIG. 1 is a block diagram showing a configuration of the coding apparatus according to Embodiment 1 of the present invention.

FIG. 1 is a block diagram showing the configuration of the coding apparatus according to the present embodiment. Coding apparatus 100 shown in FIG. 1 receives as input stereo signals formed with the left channel signal and the right channel signal in the PCM scheme on a per frame basis.

Monaural signal synthesis section 101 synthesizes left channel signal L and right channel signal R by following equation 1, to generate monaural signal M. Moreover, monaural signal synthesis section 101 generates side signal S from following equation 2 using left channel signal L and right channel signal R. Then, monaural signal synthesis section 101 outputs side signal S to LP analysis and quantization section 102 and LP inverse filter 103, and outputs monaural signal M to monaural coding section 104.

(Equation 1)

$$M(n) = \frac{1}{2}[L(n) + R(n)] \quad [1]$$

(Equation 2)

$$S(n) = \frac{1}{2}[L(n) - R(n)] \quad [2]$$

In these equations 1 and 2, n represents a time index in a frame. The synthesis method to generate a monaural signal is not limited to equation 1. For example, it is equally possible to generate a monaural signal using other methods, for example, a method of adaptively weighting and mixing signals.

LP analysis and quantization section 102 calculates LP parameters based on LP analysis (linear prediction analysis) and quantizes those LP parameters for side signal S, and outputs coded data of the resulting LP parameters to multiplexing section 118 and resulting LP coefficients $A_s$ to LP inverse filter 103.

LP inverse filter 103 performs LP inverse filtering for side signal S using LP coefficients $A_s$, and outputs the residual signal of the resulting side signal (hereinafter "side residual signal") to windowing section 105.

Monaural coding section 104 encodes monaural signal M, and outputs the resulting coded data to multiplexing section 118. In addition, monaural coding section 104 outputs monaural residual signal Mres to windowing section 106. A residual signal may also be referred to as an "excitation signal." This residual signal can be extracted in most monaural speech coding apparatuses (e.g. CELP (Code Excited Linear Prediction)-based coding apparatuses) or in coding apparatuses of the type including the process of generating an LP residual signal or a residual signal subject to local decoding.

Windowing section 105 performs windowing on side residual signal Sres, and outputs the side residual signal after windowing to MDCT transformation section 107. Windowing section 106 performs windowing on monaural residual signal Mres, and outputs the monaural residual signal after windowing to MDCT transformation section 108.

MDCT transformation section 107 executes MDCT transformation on side residual signal Sres after windowing, and outputs resulting frequency coefficients s(f) of the side residual signal to spectrum division section 109. MDCT transformation section 108 executes MDCT transformation on monaural residual signal Mres after windowing, and outputs resulting frequency coefficients m(f) of the monaural residual signal to spectrum division section 110.

Spectrum division section 109 divides the band of frequency coefficients s(f) for the side residual signal into low band part, middle band part and high band part, defining boundaries at predetermined frequencies, and outputs frequency coefficients $s_L(f)$ for the low band part of the side residual signal to low band coding section 111. In addition, spectrum division section 109 further divides the middle band part of the side residual signal into smaller subbands i, and outputs frequency coefficients $s_{M,i}(f)$ for each subband part of the side residual signal to ICP analysis sections 113, 114 and 115, where i represents a subband index, and is an integer of zero or more.

Spectrum division section 110 divides the band of frequency coefficients m(f) for the monaural residual signal into low band part, middle band part and high band part, defining boundaries at predetermined frequencies, and outputs frequency coefficients $m_L(f)$ for the low band part of the monaural residual signal to ICP analysis section 115. In addition, spectrum division section 110 further divides the middle band part of the monaural residual signal into smaller subbands i, and outputs frequency coefficients $m_{M,i}(f)$ for each subband part of the side residual signal to ICP analysis section 114.

Low band coding section 111 encodes frequency coefficients $s_L(f)$ for the low band part of the side residual signal, and outputs the resulting coded data to low band decoding section 112 and multiplexing section 118.

Low band decoding section 112 decodes the coded data of the frequency coefficients for the low band part of the side residual signal, and outputs resulting frequency coefficients $s_L'(f)$ for low band part of the side residual signal to ICP analysis section 113 and selection section 116.

ICP analysis section 113, which is configured with an adaptive filter, performs an ICP analysis of frequency coefficients $s_L'(f)$ for low band part of the side residual signal as a reference signal candidate and frequency coefficients $s_{M,i}(f)$ for each subband part of the side residual signal, to generate the first ICP coefficients, and outputs these to selection section 116.

ICP analysis section 114, which is configured with an adaptive filter, performs an ICP analysis of frequency coefficients $m_{M,i}(f)$ for each subband part of the monaural residual signal as a reference signal candidate and frequency coefficients $s_{M,i}(f)$ for each subband part of the side residual signal, to generate second ICP coefficients, and outputs these to selection section 116.

ICP analysis section 115, which is configured with an adaptive filter, performs an ICP analysis of frequency coefficients $m_L(f)$ for low band part of the monaural residual signal as a reference signal candidate and frequency coefficients $s_{M,i}(f)$ for each subband part of the side residual signal, to generate third ICP coefficients, and outputs these to selection section 116.

By checking the relationships between each reference signal candidate and frequency coefficients $s_{M,i}(f)$ for each subband part of the side residual signal, selection section 116 selects the optimum signal as a reference signal among the reference signal candidates, and outputs a reference signal ID (identification) showing the selected reference signal and ICP coefficients corresponding to the selected signal to ICP parameter quantization section 117. The internal configuration of selection section 116 will be described later in detail.

ICP parameter quantization section 117 quantizes the ICP coefficients outputted from selection section 116, to encode the reference signal ID. Coded data for the quantized ICP coefficients and coded data for reference signal ID are outputted to multiplexing section 118.

Multiplexing section 118 multiplexes the coded data of the LP parameters outputted from LP analysis and quantization section 102, the coded data of the monaural signal outputted from monaural coding section 104, the coded data of frequency coefficients for the low band part of the side residual signal outputted from low band coding section 111, and the coded data of the quantized ICP coefficients and the coded data of reference signal ID outputted from ICP parameter quantization section 117, to output the resulting bit stream.

Figure 2:
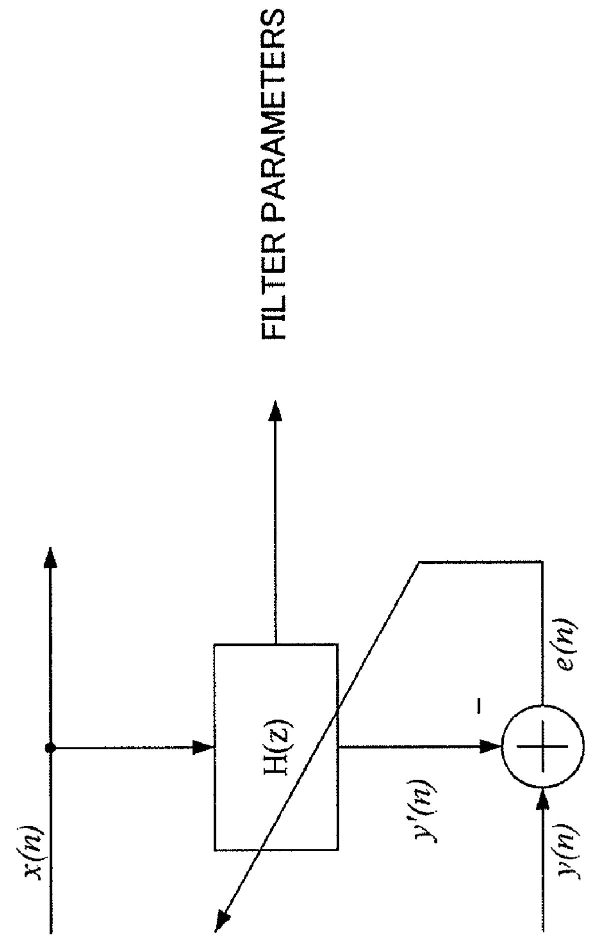
FIG. 2 is a block diagram showing the main internal configuration of the ICP analysis section according to Embodiment 1 of the present invention.

FIG. 2 shows the configuration and operations of adaptive filters forming ICP analysis sections 113, 114 and 115. In this figure, $H(z)=b_0+b_1(z^{-1})+b_2(z^{-2})+\ldots+b_k(z^{-k})$, and H(z) represents a model (transfer function) of an adaptive filter, for example, an FIR (Finite Impulse Response) filter. Here, k represents an order of adaptive filter coefficients and $b=[b_0, b_1, \ldots, b_k]$ represents adaptive filter coefficients. x(n) represents an input signal (reference signal) of the adaptive filter, y'(n) represents an output signal (prediction signal) of the adaptive filter and y(n) represents a target signal of the adaptive filter. For example, in ICP analysis section 113, x(n) corresponds to $s_L'(f)$ and y(n) corresponds to $s_{M,i}(f)$.

Based on following equation 3, the adaptive filter finds and outputs adaptive filter parameters $b=[b_0, b_1, \ldots, b_k]$ such that the mean squared error (MSE) between a prediction signal and the target signal is the minimum. In equation 3, E{ } represents the ensemble average operation, k represents the filter order, and e(n) represents the prediction error.

(Equation 3)

$$\begin{aligned} MSE(b) &= E\{[e(n)]^2\} \\ &= E\{[y(n)-y'(n)]^2\} \\ &= E\left\{\left[y(n)-\sum_{i=0}^{k} b_i x(n-i)\right]^2\right\} \end{aligned} \quad [3]$$

Figure 3:
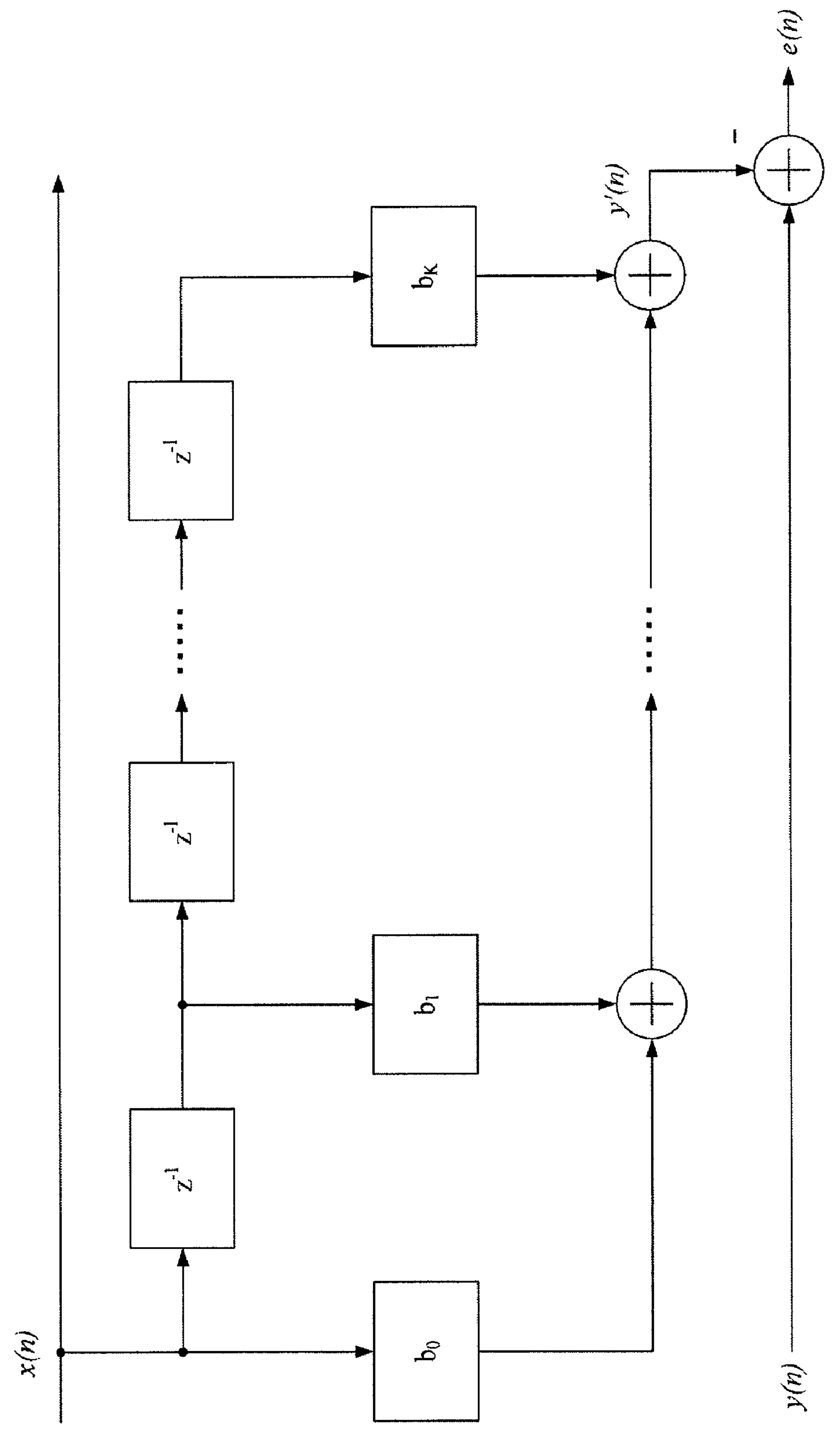
FIG. 3 shows an example of an adaptive FIR filter used in ICP analysis and ICP synthesis.

H(z) in FIG. 2 has many other configurations. FIG. 3 shows one of them. The filter configuration shown in FIG. 3 is a conventional FIR filter.

Figure 4:
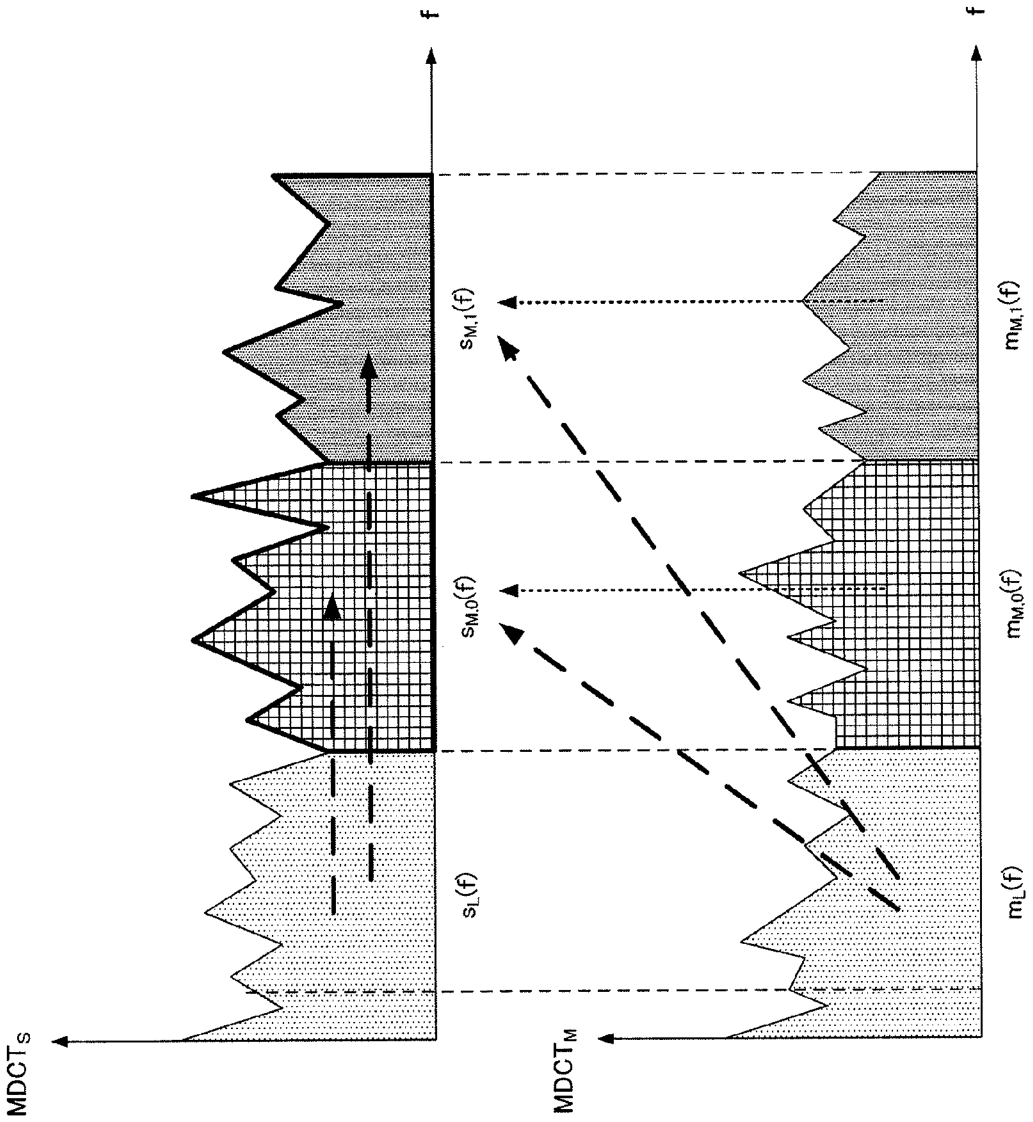
FIG. 4 is provided to explain the selection of a reference signal in the selection section of the coding apparatus according to Embodiment 1 of the present invention.

FIG. 4 is provided to explain the selection of the reference signal in selection section 116. FIG. 4 shows a case where the number of subbands is 2(i=0, 1). The horizontal axes in FIG. 4 show frequency, the vertical axes show frequency coefficient (MDCT coefficient) values, the upper part shows frequency bands of the side residual signal and the lower part shows frequency bands of the monaural residual signal.

In this case, selection section 116 selects the reference signal where frequency coefficients $s_{M,0}(f)$ for the 0-th subband part of the side residual signal are predicted, from frequency coefficients $m_{M,0}(f)$ for the 0-th subband part, frequency coefficients $m_L(f)$ for the low band part of the monaural residual signal and frequency coefficients $s_L'(f)$ for the low band part of the side residual signal. Likewise, selection section 116 selects the reference signal where frequency coefficients $s_{M,1}(f)$ for the first subband part of the side residual signal are predicted, from frequency coefficients $m_{M,1}(f)$ for the first subband part, frequency coefficients $m_L(f)$ for the low band part of the monaural residual signal and frequency coefficients $s_L'(f)$ for the low band part of the side residual signal.

Figure 5:
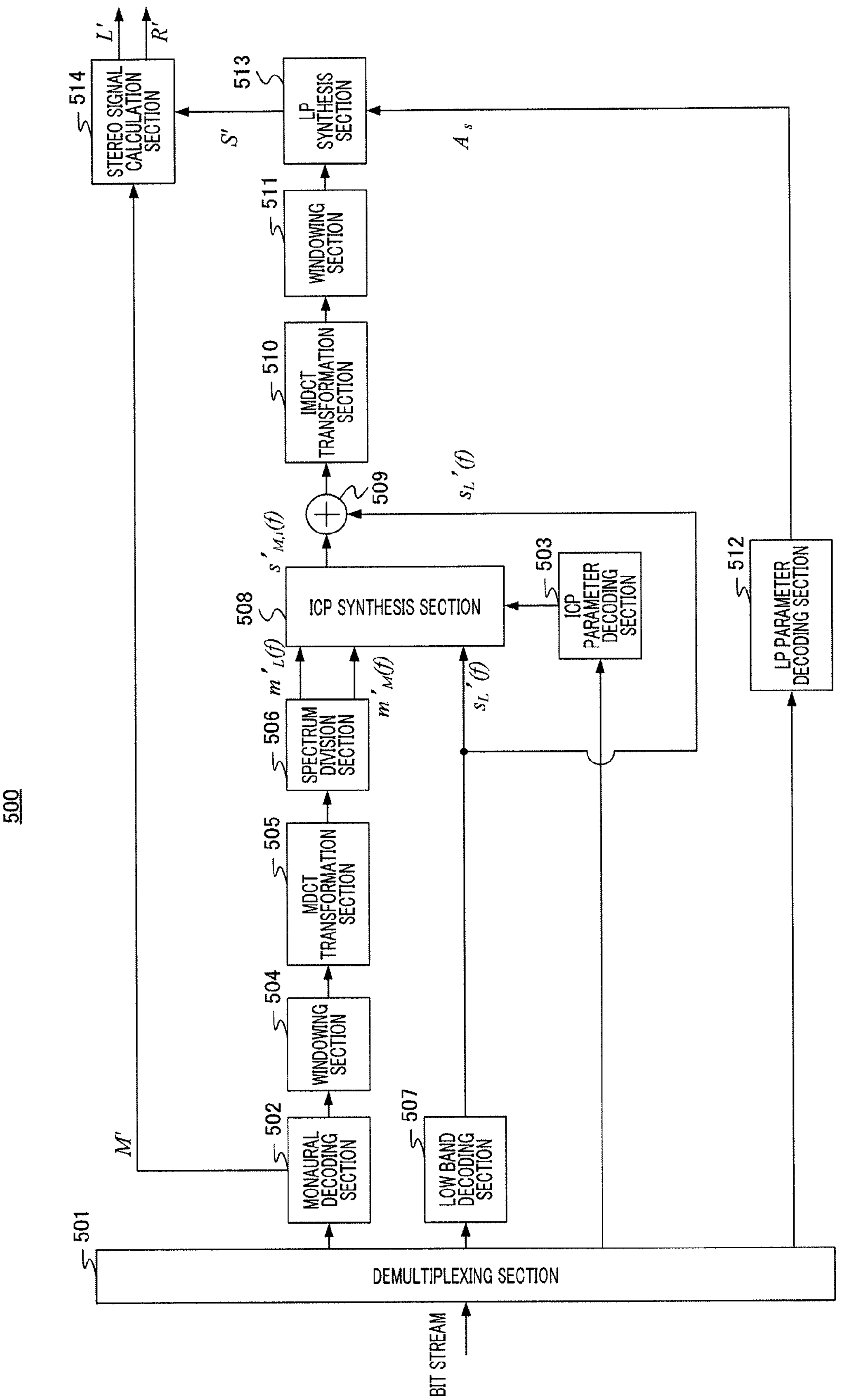
FIG. 5 is a block diagram showing a configuration of the decoding apparatus according to Embodiment 1 of the present invention.

FIG. 5 is a block diagram showing the configuration of the decoding apparatus according to the present embodiment. The bit stream transmitted from coding apparatus 100 shown in FIG. 1 is received in decoding apparatus 500 shown in FIG. 5.

Demultiplexing section 501 demultiplexes the bit stream received in decoding apparatus, outputs LP parameter coded data to LP parameter decoding section 512, outputs ICP coefficient coded data and reference signal ID coded data to ICP parameter decoding section 503, outputs monaural signal coded data to monaural decoding section 502, and outputs coded data of frequency coefficients for the low band part of a side residual signal to low band decoding section 507.

Monaural decoding section 502 decodes the monaural signal coded data, to acquire monaural signal M' and monaural residual signal M'res. Monaural decoding section 502 outputs the resulting monaural residual signal M'res to windowing section 504 and outputs monaural signal M' to stereo signal calculation section 514.

ICP parameter decoding section 503 decodes the ICP coefficient coded data and the reference signal ID coded data, and outputs the acquired ICP coefficients and reference signal ID, to ICP synthesis section 508.

Windowing section 504 performs windowing on monaural residual signal M'res and outputs the monaural residual signal after windowing to MDCT transformation section 505. MDCT transformation section 505 executes MDCT transformation on monaural residual signal M'res after windowing, and outputs resulting frequency coefficients m'(f) of the monaural residual signal to spectrum division section 506.

Spectrum division section 506 divides the band of frequency coefficients m'(f) for the monaural residual signal into low band part, middle band part and high band part, defining boundaries at predetermined frequencies, and outputs frequency coefficients $m'_L(f)$ for the low band part and frequency coefficients $m'_M(f)$ for the middle band part of the monaural residual signal to ICP synthesis section 508.

Low band decoding section 507 decodes the coded data of the frequency coefficients for the low band part of the side residual signal, and outputs resulting frequency coefficients $s_L'(f)$ for low band part of the side residual signal to ICP synthesis section 508 and addition section 509.

Based on the reference signal ID, ICP synthesis section 508 selects a signal as a reference signal among frequency coefficients $m'_L(f)$ of the low band part of the monaural residual signal, frequency coefficients $m'_M(f)$ of the middle band part of the monaural residual signal and frequency coefficients $s_L'(f)$ of the low band part of the side residual signal. Then, ICP synthesis section 508 calculates frequency coefficients $s'_{M,i}(f)$ of each subband part of the side residual signal by the filtering process represented by following equation 4 using quantization ICP coefficients as filter coefficients, and outputs the frequency coefficients for each subband part of the side residual signal to addition section 509. In equation 4, h(i) represents the ICP coefficients, X(f) represents the reference signal, and P represents the ICP order.

(Equation 4)

$$s'_{M,i}(f) = \sum_{i=0}^{P} h(i)X(f-i) \quad [4]$$

Addition section 509 combines frequency coefficients $s_L'(f)$ of the low band part of the side residual signal and frequency coefficients $s'_{M,i}(f)$ of each subband part of the side residual signal, and outputs resulting frequency coefficients s'(f) of the side residual signal to IMDCT transformation section 510.

IMDCT transformation section 510 executes IMDCT transformation on frequency coefficients s'(f) of the side residual signal, and outputs the resulting signal to windowing section 511. Windowing section 511 performs windowing on the output signal from IMDCT transformation section 510, and outputs resulting side residual signal S'res to LP synthesis section 513.

LP parameter decoding section 512 decodes the LP parameter coded data and outputs resulting LP coefficients $A_S$ to LP synthesis section 513.

LP synthesis section 513 performs LP synthesis filtering on side residual signal S'res using the LP coefficients $A_S$, to acquire side signal S'.

Stereo signal calculation section 514 acquires left channel signal L' and right channel signal R' using monaural signal M' and side signal S' by following equations 5 and 6.

[5]

$$L'(n)=M'(n)+S'(n) \quad \text{Equation 5)}$$

[6]

$$R'(n)=M'(n)-S'(n) \quad \text{(Equation 6)}$$

In this way, by decoding a received signal from coding apparatus 100 in FIG. 1, decoding apparatus 500 is able to acquire left channel signal L' and right channel signal R'. Decoding apparatus 500 is able to perform decoding processes as long as a bit stream is formed using LP parameter coded data, ICP coefficient coded data, reference signal ID coded data, monaural signal coded data and coded data of frequency coefficients for the low band part of a side residual signal. That is, as long as signals received in decoding apparatus are signals from a coding apparatus that can form these bit streams, the signals may not be transmitted from coding apparatus 100 of FIG. 1.

Next, the internal configuration of selection section 116 will be explained in detail. With the present embodiment, a case where the reference signal is selected based on cross-correlation (the first example) and a case where the reference signal is selected based on predicted gain (the second example) will be explained.

Figure 6:
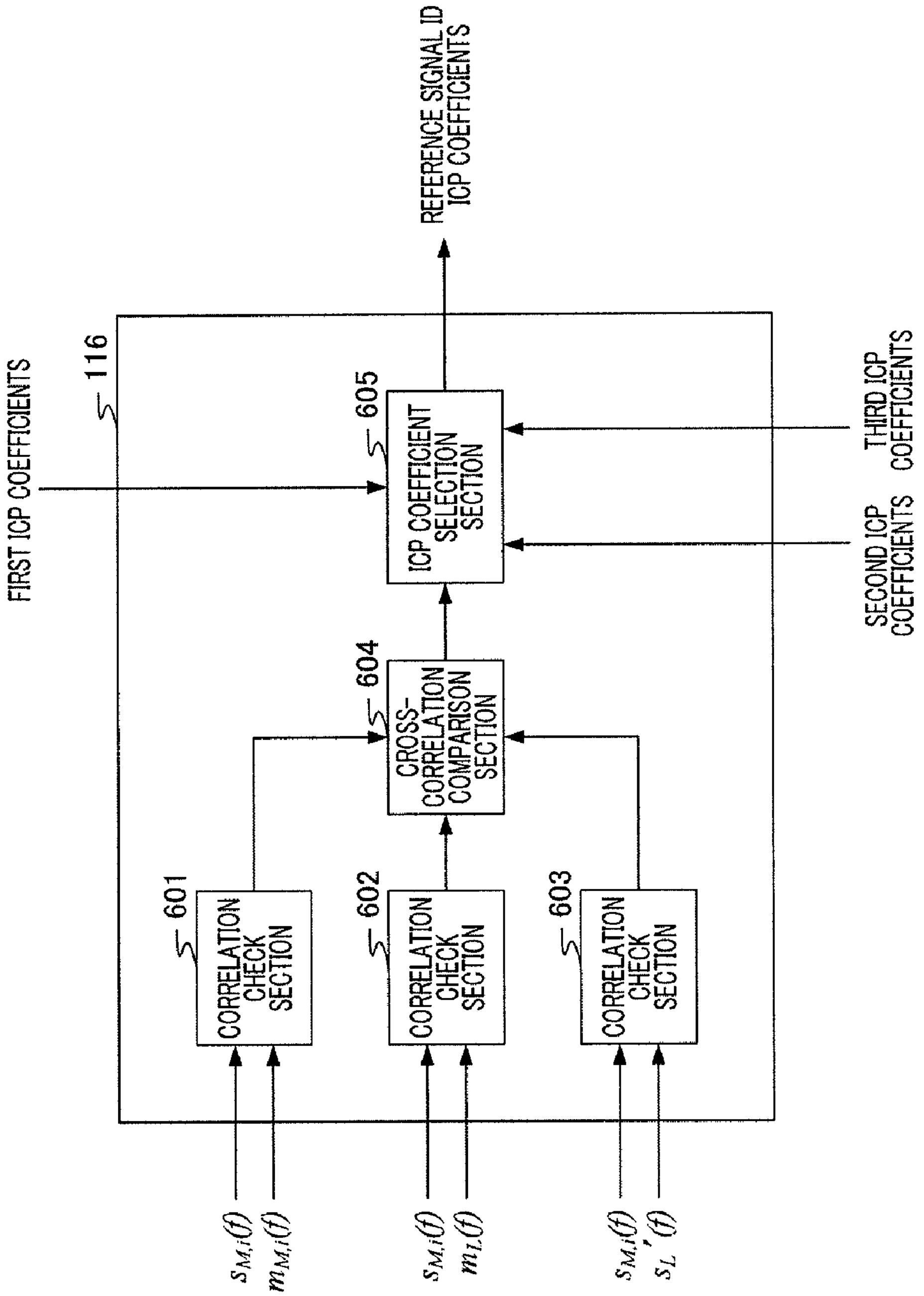
FIG. 6 is a block diagram showing the internal configuration of the selection section in the first example of the coding apparatus according to Embodiment 1 of the present invention.

FIG. 6 is a block diagram showing the internal configuration of selection section 116 in the first example. Selection section 116 receives as input frequency coefficients $s_L'(f)$ for the low band part of the side residual signal, frequency coefficients $m_{M,i}(f)$ for each subband part of the monaural residual signal, frequency coefficients $m_L(f)$ for the low band part of the monaural residual signal, frequency coefficients $s_{M,i}(f)$ for each subband part of the side residual signal, the first ICP coefficients, the second ICP coefficients and the third ICP coefficients.

Correlation check sections 601, 602 and 603 each calculate cross-correlation by following equation 7, and output the correlation values as calculation results to cross-correlation comparison section 604. Here, in equation 7, X(j) represents either reference signal candidate, that is, represents frequency coefficients $m_{M,i}(f)$ for each subband part of the monaural residual signal in correlation check section 601, frequency coefficients $m_L(f)$ for the low band part of the monaural residual signal in correlation check section 602, and frequency coefficients $s_L'(f)$ for the low band part of the side residual signal in correlation check section 603.

(Equation 7)

$$corr = \frac{\sum_j [X(j) \times s_{M,i}(j)]}{\sqrt{\sum_j X(j)^2}\sqrt{\sum_j s_{M,i}(j)^2}} \quad [7]$$

Cross-correlation comparison section 604 selects a reference signal candidate having the highest correlation value as a reference signal, and outputs the reference signal ID showing the selected reference signal to ICP coefficient selection section 605.

ICP coefficient selection section 605 selects ICP coefficients corresponding to the reference signal ID, and outputs the reference signal ID and the ICP coefficients to ICP parameter quantization section 117.

Figure 7:
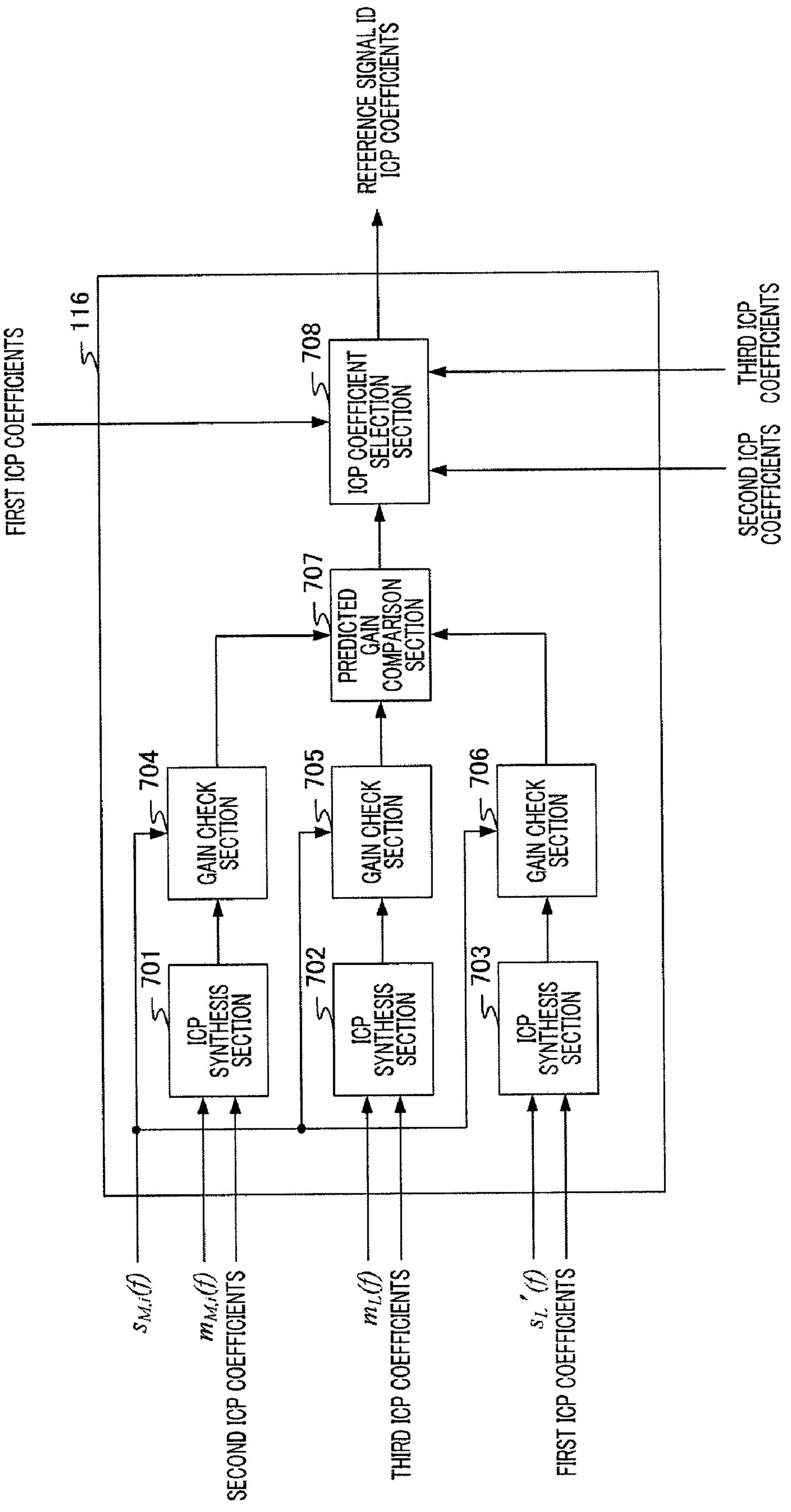
FIG. 7 is a block diagram showing the internal configuration of the selection section in a second example of the coding apparatus according to Embodiment 1 of the present invention.

FIG. 7 is a block diagram showing the internal configuration of selection section 116 in the second example. Selection section 116 receives as input frequency coefficients $s_L'(f)$ for the low band part of the side residual signal, frequency coefficients $m_{M,i}(f)$ for each subband part of the monaural residual signal, the frequency coefficients $m_L(f)$ for the low band part of the monaural residual signal, frequency coefficients $s_{M,i}(f)$ for each subband part of the side residual signal, the first ICP coefficients, the second ICP coefficients and the third ICP coefficients.

ICP synthesis sections 701, 702 and 703 calculate the frequency coefficients $s'_{M,i}(f)$ of each subband part of the side residual signal corresponding to each reference signal by above equation 4, and output the resulting frequency coefficients to gain check sections 704, 705 and 706.

Gain check sections 704, 705 and 706 each calculate predicted gain by following equation 8, and outputs the resulting predicted gains to predicted gain comparison section 707. Here, in equation 8, $e(n)=s_{M,i}(f)-s'_{M,i}(f)$. The prediction performance improves when the predicted gain Gain is higher in equation 8.

(Equation 8)

$$\text{Gain} = 10\log_{10}\frac{\sum s_{M,i}^2(n)}{\sum e^2(n)} \quad [8]$$

Predicted gain comparison section 707 compares the predicted gains, to select a reference signal candidate having the highest predicted gain as a reference signal, and outputs the reference signal ID showing the selected reference signal to ICP coefficient selection section 708.

ICP coefficient selection section 708 selects ICP coefficients corresponding to the reference signal ID, and outputs the reference signal ID and the ICP coefficients to ICP parameter quantization section 117.

As described above, according to the present embodiment, by selecting a signal providing the optimum prediction result as a reference signal among a plurality of signals and by predicting a residual signal of a side signal using the reference signal, it is possible to improve ICP prediction performance in stereo speech coding.

In the above second example, quantized ICP coefficients may be used in ICP synthesis. In this case, selection section 116 receives as input the quantized ICP coefficients quantized by an ICP coefficient quantizer, instead of ICP coefficients before quantization. ICP synthesis sections 701, 702 and 703 decode the side signal using quantized ICP coefficients. The predicted gains are compared based on prediction results by the quantized ICP coefficients. In this variation, prediction using quantized ICP coefficients used in a decoding apparatus makes it possible to select the optimum reference signal.

Embodiment 2

Figure 8:
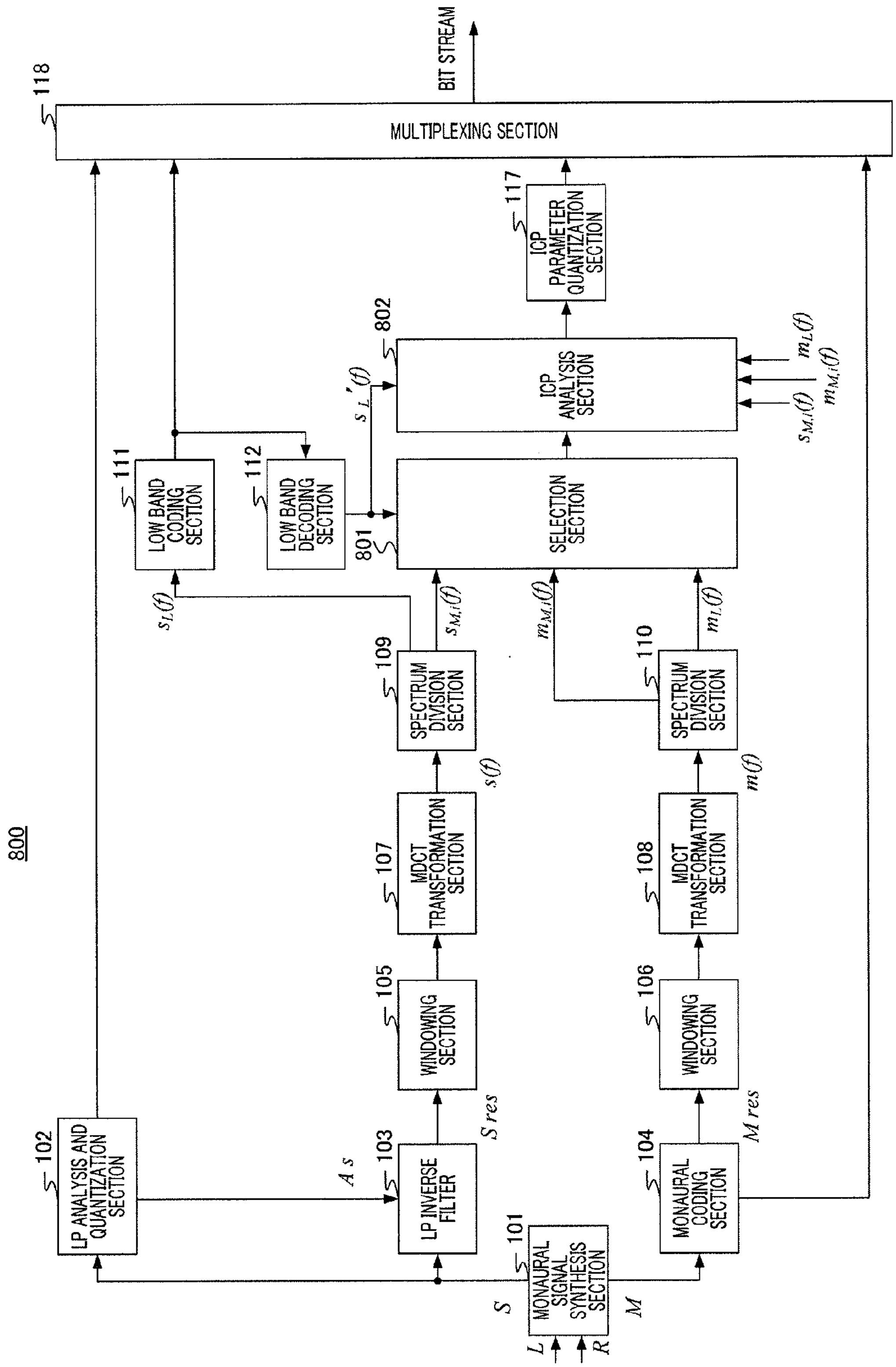
FIG. 8 is a block diagram showing a configuration of the coding apparatus according to Embodiment 2 of the present invention.

With Embodiment 2 of the present invention, a case will be explained where ICP coefficients are calculated after comparing cross-correlation. FIG. 8 shows a block diagram showing the configuration of the coding apparatus according to the present embodiment. In the coding apparatus in FIG. 8, the same reference numerals are assigned to the components in the coding apparatus shown in FIG. 1, and the explanation thereof will be omitted. Compared with coding apparatus 100 shown in FIG. 1, coding apparatus 800 shown in FIG. 8 adopts the configuration removing ICP analysis sections 113, 114 and 115 and selection section 116, and adding selection section 801 and ICP analysis section 802.

By checking the relationships between reference signal candidates and the frequency coefficients $s_{M,i}(f)$ of each subband part of the side residual signal, selection section 801 selects the optimum signal as a reference signal among the reference signal candidates, and outputs a reference signal ID showing the selected reference signal, to ICP analysis section 802.

ICP analysis section 802, which is configured with an adaptive filter, performs an ICP analysis using the reference signal and frequency coefficients $s_{M,i}(f)$ of each subband part of the side residual signal, to generate ICP coefficients and outputs these to ICP parameter quantization section 117.

Figure 9:
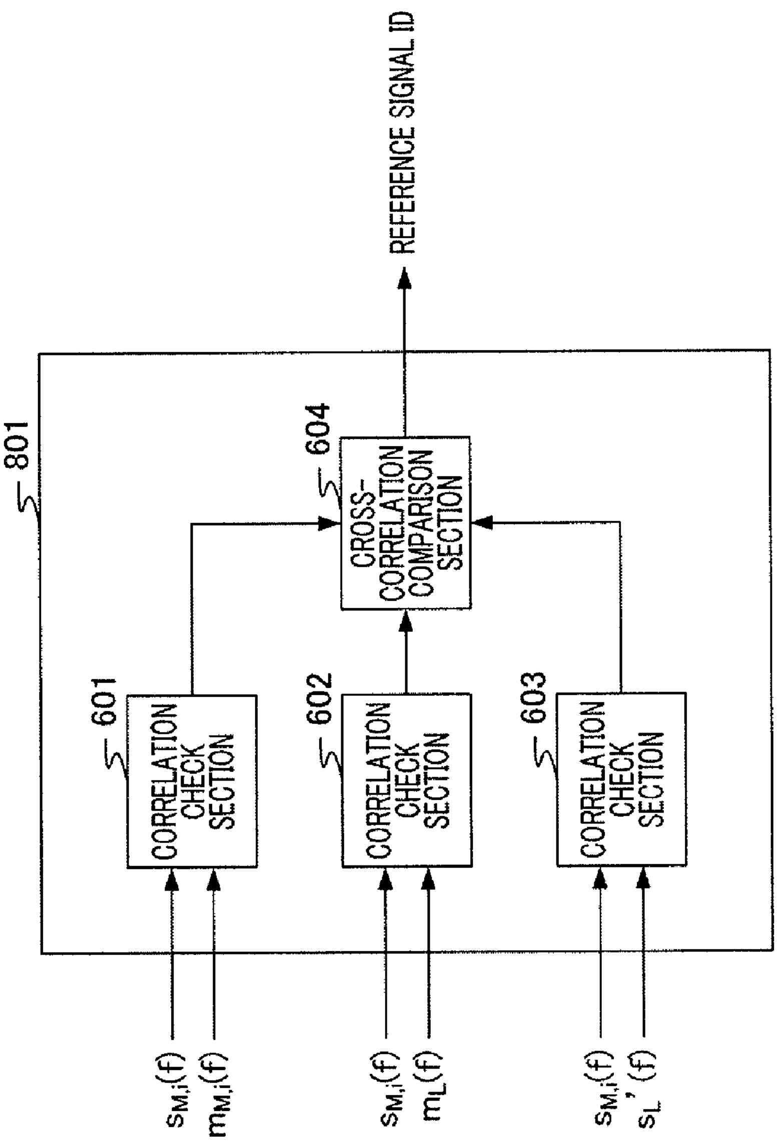
FIG. 9 is a block diagram showing the internal configuration of the selection section in the coding apparatus according to Embodiment 2 of the present invention.

FIG. 9 is a block diagram showing the internal configuration of selection section 801. Compared with the internal configuration of selection section 116 shown in FIG. 6, the internal configuration of selection section 801 shown in FIG. 16 adopts a configuration removing ICP coefficient selection section 605.

Cross-correlation comparison section 604 selects the reference signal candidate having the highest correlation value as a reference signal, and outputs a reference signal ID showing the selected reference signal to ICP analysis section 802.

In this way, according to the present embodiment, ICP coefficients can be calculated after comparing cross-correlation, so that the present embodiment provides the same advantage as in Embodiment 1 and it is possible to reduce the amount of calculation as compared with Embodiment 1.

Embodiment 3

In Embodiment 3, modified ICP, which is a modified version of conventional ICP, will be explained. Modified ICP is provided to solve the problem about the prediction method using a reference signal of a different length from the target signal.

Figure 10:
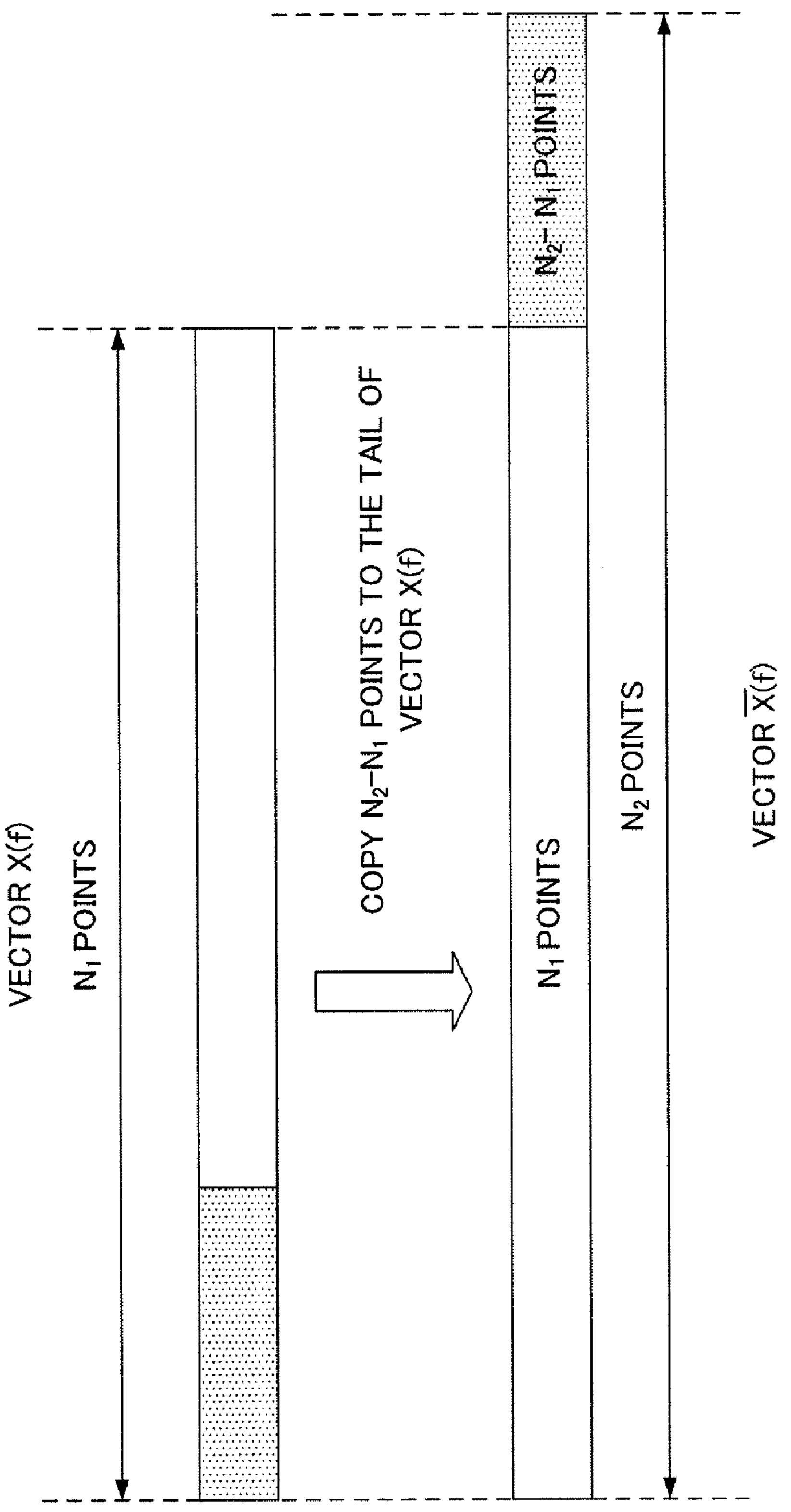
FIG. 10 explains the prediction method in modified ICP according to Embodiment 3 of the present invention.

FIG. 10 explains the prediction method in modified ICP in the present embodiment. The modified ICP method in the present embodiment is referred to as the "copy method." In FIG. 10, the length of reference signal X(f) (vector) is represented by $N_1$ and the length of the target signal is represented by $N_2$. X(j) represents either reference signal candidate.

Two cases are taken into account in modified ICP.

Case 1: $N_1=N_2$

In this case, the coding apparatus calculates ICP coefficients using conventional ICP. This case may be applicable to all kinds of reference signals.

Case 2: $N_1<N_2$ or $N_1>N_2$

In this case, the coding apparatus generates new reference signal $X^{\sim}(f)$ of a length of $N_2$ based on original reference signal X(f), predicts the target signal using new reference signal $X^{\sim}(f)$ and calculates ICP coefficients. Then, the decoding apparatus generates $X^{\sim}(f)$ using the same method as in the coding apparatus. This case can happen when a low band side signal or a low band monaural signal is selected as the reference signal. The lengths of these signals can be shorter or longer than the target signal.

The copy method according to the present embodiment solves problems of case 2 above. There are two steps in this copy method.

Step 1: If $N_1<N_2$, as shown in FIG. 10, $(N_2-N_1)$ points at the head of vector X(f) are copied to the tail of vector X(f) (of a length of $N_1$), to form new vector $X^-(f)$. Further, if $N_1>N_2$, the first $N_2$ points of vector X(f) are copied to form new reference vector $X^-(f)$. X(f) is new reference vector of a length of $N_2$.

Step 2: target signal $s_{M,i}(f)$ is predicted from vector $X^-(f)$ using ICP algorithms.

In this way, according to modified ICP with the present embodiment, it is possible to make the subband length of the target signal variable regardless of the length of the reference signal, so that prediction is made possible using a reference signal of a different length from the length of the target signal. That is, it is not necessary to divide entire subband into subbands of the same fixed lengths as the reference signal. Given that low band part of a frequency band has a significant influence upon speech quality is significant, by dividing a low subband into subbands of a shorter length and, conversely, dividing a high frequency subband that becomes relatively less important, into subbands of a longer length and by performing prediction in units of that divided band, it is possible to improve the efficiency of coding and improve sound quality in scalable stereo speech coding.

Further, when a low band side signal is selected as a reference signal, in conventional ICP, it is necessary to encode a reference signal of the same length as the subband of the prediction target and transmit it to the decoder. Meanwhile, with modified ICP according to the present embodiment, it is possible to perform prediction using a reference signal of a shorter bandwidth than the target subband, and, instead of encoding a long reference signal, it is necessary only to encode a short reference signal. Accordingly, modified ICP according to the present embodiment makes it possible to transmit a reference signal to the decoder at low bit rates.

Embodiment 4

With Embodiment 4, an alternative method in case 2 in Embodiment 3 (i.e. $N_1<N_2$ or $N_1>N_2$). The prediction method by modified ICP of the present embodiment includes stretching a short reference vector to a new reference vector by interpolation or shortening the reference vector to a shorter vector, using the values of the points in the reference vector. The method of modified ICP according to the present embodiment is referred to as "stretching and shortening method."

There are two steps in this stretching and shortening method according to the present embodiment.

Figure 11:
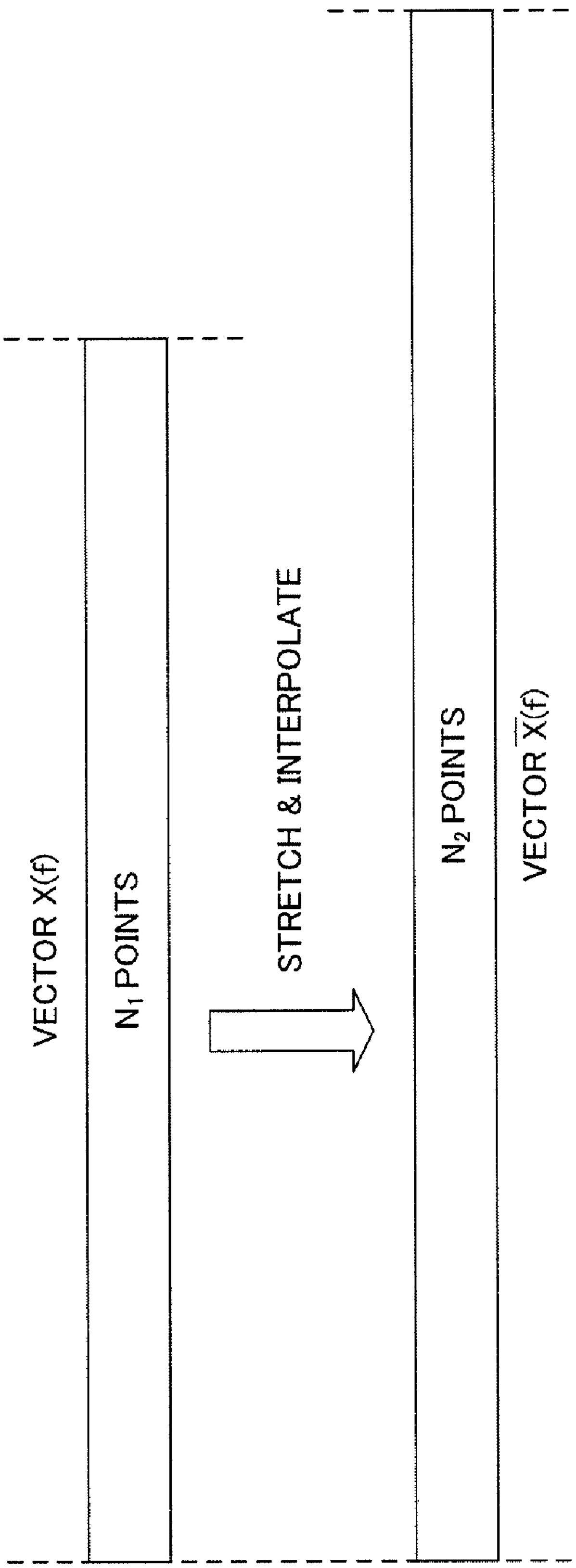
FIG. 11 explains the prediction method in modified ICP according to Embodiment 4 of the present invention.

Step 1: If $N_1<N_2$, as shown in FIG. 11, vector X(f) (of a length of $N_1$) is stretched to vector $X^-(f)$ of a length of $N_2$ by following equation 9.

(Equation 9)

$$\overline{X}\left(\left\lfloor \frac{k\times N_2}{N_1} \right\rfloor\right) = X(k),\ 0 \le k < N_1 \qquad [9]$$

One of various interpolation methods such as nearest neighbor interpolation, linear interpolation, cubic spline interpolation, and Lagrange interpolation can be applied to $X^-(f)$ to find the value where points of vector $X^-(f)$ are missing. Further, if $N_1>N_2$, vector X(f) (of a length of $N_1$) is shortened to vector $X^-(f)$ of a length of $N_2$ by following equation 10.

(Equation 10)

$$\overline{X}(k) = X\left(\left\lfloor \frac{k\times N_1}{N_2} \right\rfloor\right),\ 0 \le k < N_2 \qquad [10]$$

Step 2: target signal $s_{M,i}(f)$ is predicted from vector $X^-(f)$ using ICP algorithms.

Embodiment 5

With Embodiment 5, an alternative method of Embodiments and 4 (cases of $N_1<N_2$ or $N_1>N_2$) will be explained. The prediction method by modified ICP according to the present embodiment includes finding periods inside the reference signal and the target signal using long term prediction. New reference signal is generated by duplicating several periods of the original reference signal based on the resulting period.

There are two steps in the method according to the present embodiment.

Step 1: reference signal X(f) and target signal $s_{M,i}(f)$ are concatenated, to acquire continued vector $X_L(f)$. It is assumed that a period is present inside the vector $X_L(f)$. Period T is found by minimizing error err in following equation 11. Period T can be found by using other period calculation algorithms such as an autocorrelation method, and magnitude difference function (see Non-Patent Document 5).

(Equation 11)

$$err = \sum_{j=N_1}^{N_1+N_2} \left(\hat{X}(j) - X_L(j)\right)^2 \qquad [11]$$

$$\text{where } \hat{X}(j) = b\times X_L(j-T),\ b = \frac{\sum_{N_1+N_2} X_L(j)\times X_L(j-T)}{\sum_{N_1+N_2} X_L^2(j-T)}$$

If $T>\min[N_1,N_2]$, then let $T=\min[N_1,N_2]$. Based on T, a signal of a length of T from X(f) is copied one time or a few times, to obtain new reference signal $X^-(f)$ of a length of $N_2$.

Step 2: target signal $s_{M,i}(f)$ is predicted from vector $X^-(f)$ using ICP algorithms.

To use the method according to the present embodiment, information about period T is needed to be transmitted to the decoding apparatus.

Although cases have been explained with Embodiments 3, 4 and 5 where, when the low band part of the monaural residual signal is selected as a reference signal, prediction is performed after the generation of the reference signal of an expanded length of the monaural residual signal using one of methods according to the above embodiments, with the present invention, a reference signal of a desired length may be generated by including a middle band of the monaural residual signal. This case corresponds to case 1 ($N_1=N_2$) described in Embodiment 3.

Further, in Embodiments 3, 4 and 5, upon dividing the middle band of the side residual signal into subbands and performing prediction, when the low band part of the side residual signal is selected as a reference signal by performing prediction continuously from a subband on the low band side to a subband on the high band side, a reference signal of a desired length may be generated also using a subband signal already predicted in advance on the low band side.

Embodiments of the present invention have been explained.

The method according to the present invention can be referred to as "ACP: Adaptive Channel Prediction," by selecting a signal providing the optimum prediction result as a reference signal among a plurality of signals and by predicting a side residual signal using the reference signal in ICP. By using this ACP according to the present invention, it is possible to improve ICP prediction performance in scalable stereo speech coding.

In cases where the monaural signal encoder/decoder is a transform coder, such as MDCT transform coder, a decoded monaural signal (or decoded monaural LP residual signal) in the MDCT domain is directly acquired from a monaural encoder on the encoder side and from a monaural decoder at the decoder side.

The coding scheme described in the above embodiments uses monaural signals to predict side signals. This scheme is referred to as the "M-S type." A left or right signal may be predicted using a monaural signal. The operations in this case are virtually the same as those of the M-S type process in the above embodiments except that the side channel is replaced by the left or right channel (i.e. L or R is regarded as S) and the left (or right) channel signal is encoded. In this case, the signal of one channel (the right or left channel) of the other channel coded on the coding side (the left or right channel) is calculated in the decoder using the decoded channel signal (left or right channel signal) and the monaural signal as in following equations 12 and 13. Both (L and R) channels may be encoded as the side signals described in the above embodiments.

[12]

$$R(n)=2M(n)-L(n) \text{ where the coding target is the left } (L) \text{ channel} \quad \text{(Equation 12)}$$

[13]

$$L(n)=2M(n)-R(n) \text{ where the coding target is the right } (R) \text{ channel} \quad \text{(Equation 13)}$$

Further, in the present invention, as the reference signal candidates in the above embodiments, the weighted sum of those may be used (i.e. the signal in which three kinds of signals are added after multiplying them by a predetermined weighing factor). Further, in the present invention, all the three reference signal candidates are not necessarily used, and, for example, only two of them, a monaural signal in the middle band and a side signal in the low band may be used as candidates. This makes it possible to reduce the number of bits to transmit a reference signal ID.

Further, with the above embodiments, side signals are predicted on a per frame basis. This means that a middle band signal is predicted from a signal in the same frame on the other frequency band. Besides this, or in addition to this, inter-frame prediction can also be used. For example, the past frames can be used as a reference candidate to predict a current frame signal.

Although cases have been explained with the above embodiments where the target signal as the target of prediction is a middle band side signal except a low band and a high band, the present invention is not limited to this, and, the target signal may include all signal bands including middle bands and high bands except low bands. Further, all signal bands including low signal bands may be the target. Even in these cases, the prediction can be performed by dividing an arbitrary band of the side signal into small subbands. This will not change structures of the encoder and the decoder.

The present invention is applicable to signals in the time domain. For example, a reference signal can be selected from several subband signals in the time domain (e.g. acquired by QMF: Quadrature Mirror Filter), to predict a middle (or high) band signal in the time domain.

Examples of preferred embodiments of the present invention have been described above, and the scope of the present invention is by no means limited to the above-described embodiments. The present invention is applicable to any system having a coding apparatus and a decoding apparatus.

The coding apparatus and the decoding apparatus according to the present invention can be provided in a communication terminal apparatus and base station apparatus in a mobile communication system, so that it is possible to provide a communication terminal apparatus, base station apparatus and mobile communication system having same advantages and effects as described above.

Further, although cases have been described with the above embodiment as examples where the present invention is configured by hardware, the present invention can also be realized by software. For example, it is possible to implement the same functions as in the base station apparatus according to the present invention by describing algorithms of the radio transmitting methods according to the present invention using the programming language, and executing this program with an information processing section by storing in memory.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC," "system LSI," "super LSI," or "ultra LSI" depending on differing extents of integration.

Further, the method of circuit integration is not limited to LSIs, and implementation using dedicated circuitry or general purpose processors is also possible. After LSI manufacture, utilization of a programmable FPGA (Field Programmable Gate Array) or a reconfigurable process or where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2007-284622, filed on Oct. 31, 2007, including the specification, drawings and abstract, is incorporated herein by reference in its entirety.

INDUSTRIAL APPLICABILITY

The coding apparatus and the coding method according to the present invention is suitable for use in mobile phones, IP phones, video conferences and so on.

The invention claimed is:

1. A coding apparatus comprising:

a monaural signal generator that synthesizes a first channel signal and a second channel signal in a stereo signal, to generate a monaural signal, and generates a side signal, the side signal being a difference between the first channel signal and the second channel signal;

a side residual signal acquirer that acquires a side residual signal, the side residual signal being a linear prediction residual signal for the side signal;

a monaural residual signal acquirer that acquires a monaural residual signal, the monaural residual signal being a linear prediction residual signal for the monaural signal;

a first spectrum divider that divides the side residual signal into a low band part being a lower band than a predetermined frequency and a middle band part being a higher band than the predetermined frequency;

a second spectrum divider that divides the monaural residual signal into a low band part being a lower band than a predetermined frequency and a middle band part being a higher band than the predetermined frequency;

a selector that selects an optimal signal as a reference signal from reference signal candidates by checking relationships between each reference signal candidate and a target signal, the reference signal candidates being frequency coefficients for the low band part of the side residual signal, frequency coefficients for the middle band part of the monaural residual signal, and frequency coefficients for the low band part of the monaural residual signal, and the target signal being frequency coefficients for the middle band part of the side residual signal;

an inter channel prediction analyzer that performs an inter-channel prediction analysis between the reference signal and the target signal, to acquire inter-channel prediction coefficients; and an inter channel parameter quantizer that quantizes the inner-channel prediction coefficients, wherein at least one of said generator, said acquirers, said dividers, said selector, said analyzer and said quantizer is configured as a circuit or as a processor.

2. The coding apparatus according to claim 1, wherein the selector compares cross-correlation between said each reference signal candidate and the target signal and selects a reference signal candidate with a highest correlation value as a reference signal.

3. The coding apparatus according to claim 1, wherein the selector compares a predicted gain between said each reference signal candidate and the target signal and selects a reference signal candidate with a highest predicted gain value as a reference signal.

4. The coding apparatus according to claim 1, wherein:

the first spectrum divider divides the middle band part of the side residual signal into smaller subband parts;

the second spectrum divider divides the middle band part of the monaural residual signal into smaller subband parts;

the selector selects a reference signal on a per subband part basis.

5. The coding apparatus according to claim 1, wherein, when the reference signal and the target signal have different lengths, the inter-channel prediction analyzer duplicates or extracts part of the reference signal to match the lengths, and performs the inter-channel prediction analysis.

6. The coding apparatus according to claim 1, wherein, when the reference signal and the target signal have different lengths, the inter-channel prediction analyzer matches the lengths by stretching or shortening the reference signal, and performs the inter-channel prediction analysis.

7. The coding apparatus according to claim 1, wherein, when the reference signal and the target signal have different lengths, the inter-channel prediction analyzer matches the lengths by finding a period of the reference signal or the target signal and by duplicating the reference signal or the target signal in period units, and performs the inter-channel prediction analysis.

8. A decoding apparatus comprising:

a monaural decoder that decodes a monaural signal;

an inter-channel prediction parameter decoder that decodes a reference signal identification identifying a reference signal and decodes inter-channel prediction coefficients acquired by performing an inter-channel prediction analysis between the reference signal and frequency coefficients for a middle band part being a higher band than a predetermined frequency of a side residual signal, the reference signal being selected from: frequency coefficients for a low band part being a lower band than the predetermined frequency of the side residual signal, the side residual signal being a linear prediction residual signal for a side signal being a difference between a first channel signal and a second channel signal in a stereo signal; frequency coefficients for a middle band part being a higher band than the predetermined frequency of a monaural residual signal, the monaural residual signal being the linear prediction residual signal for a monaural signal generated by synthesizing the first channel signal and the second channel signal; and frequency coefficients for the low band part being a lower band than the predetermined frequency of the monaural residual signal;

an inter-channel prediction synthesizer that calculates the frequency coefficients for the middle band part of the side residual signal by filtering the reference signal using the inter-channel prediction coefficients as filter coefficients;

an adder that adds the frequency coefficients for the low band part of the side residual signal and the frequency coefficients for the middle band part of the side residual signal, to acquire frequency coefficients for an entire band of the side residual signal;

a transformer that transforms frequency coefficients for the entire band of the side residual signal into a time-domain side residual signal;

a linear prediction synthesizer that performs linear prediction synthesis filtering for the time-domain side residual signal, to acquire the side signal; and a stereo signal calculator that acquires the first channel signal and the second channel signal using the decoded monaural signal and the side signal wherein at least one of said decoders, said synthesizers, said adder, said transformer and said calculator is configured as a circuit or as a processor.

9. A coding method comprising:

synthesizing a first channel signal and a second channel signal in a stereo signal, to generate a monaural signal, and generating a side signal, the side signal being a difference between the first channel signal and the second channel signal;

acquiring step of acquiring a side residual signal, the side residual signal being a linear prediction residual signal for the side signal;

acquiring step of acquiring a monaural residual signal, the monaural residual signal being a linear prediction residual signal for the monaural signal;

dividing the side residual signal into a low band part being a lower band than a predetermined frequency and a middle band part being a higher band than the predetermined frequency;

dividing the monaural residual signal into a low band part being a lower band than a predetermined frequency and a middle band part being a higher band than the predetermined frequency;

selecting an optimal signal as a reference signal from reference signal candidates by checking relationships between each reference signal candidate and a target signal, the reference signal candidates being frequency coefficients for the low band part of the side residual signal, frequency coefficients for the middle band part of the monaural residual signal, and frequency coefficients for the low band part of the monaural residual signal, and the target signal being frequency coefficients for the middle band part of the side residual signal;

performing an inter-channel prediction analysis between the reference signal and the target signal, to acquire inter-channel prediction coefficients; and quantizing the inter-channel prediction coefficients.

10. A decoding method comprising:

decoding a monaural signal;

decoding a reference signal identification identifying a reference signal and decoding inter-channel prediction coefficients acquired by performing an inter-channel prediction analysis between the reference signal and frequency coefficients for a middle band part being a higher band than a predetermined frequency of a side residual signal, the reference signal being selected from: frequency coefficients for a low band part being a lower band than the predetermined frequency of the side residual signal, the side residual signal being a linear prediction residual signal for a side signal being a difference between a first channel signal and a second channel signal in a stereo signal; frequency coefficients for a middle band part being a higher band than the predetermined frequency of a monaural residual signal, the monaural residual signal being the linear prediction residual signal for a monaural signal generated by synthesizing the first channel signal and the second channel signal; and frequency coefficients for the low band part being a lower band than the predetermined frequency of the monaural residual signal;

calculating the frequency coefficients for the middle band part of the side residual signal by filtering the reference signal using the inter-channel prediction coefficients as filter coefficients;

adding the frequency coefficients for the low band part of the side residual signal and the frequency coefficients for the middle band part of the side residual signal, to acquire frequency coefficients for an entire band of the side residual signal;

transforming frequency coefficients for the entire band of the side residual signal into a time-domain side residual signal;

performing linear prediction synthesis filtering for the time-domain side residual signal, to acquire the side signal; and acquiring the first channel signal and the second channel signal using the decoded monaural signal and the side signal.

* * * * *